United States Patent [19]

Butler

[11] 4,438,165

[45] Mar. 20, 1984

[54] SIMULATED STAINED AND LEADED GLASS WINDOWS

[75] Inventor: Donald R. Butler, Newport Beach, Calif.

[73] Assignee: Stained Glass Overlay, Inc., Mission Viejo, Calif.

[21] Appl. No.: 386,987

[22] Filed: Jun. 10, 1982

Related U.S. Application Data

[63] Continuation-in-part of Ser. No. 158,919, Jun. 12, 1980, Pat. No. 4,335,170, which is a continuation of Ser. No. 962,123, Nov. 20, 1978, abandoned.

[51] Int. Cl.[3] .......................... B32B 17/10; B44F 1/06

[52] U.S. Cl. .......................................... 428/38; 52/311

[58] Field of Search ............... 428/38; 52/311; 156/63

[56] References Cited

U.S. PATENT DOCUMENTS

| | | | |
|---|---|---|---|
| 3,713,958 | 1/1973 | McCracken | 428/38 |
| 3,815,263 | 6/1974 | Oberwager | 428/38 X |
| 4,127,689 | 11/1978 | Holt | 428/38 |
| 4,194,669 | 3/1980 | Bromberg | 428/38 X |
| 4,217,378 | 8/1980 | Pizur | 428/38 X |
| 4,312,688 | 1/1982 | Brodis et al. | 428/38 X |
| 4,335,170 | 6/1982 | Butler | 428/38 |

FOREIGN PATENT DOCUMENTS

| | | | |
|---|---|---|---|
| 2486878 | 1/1982 | France | 428/38 |

*Primary Examiner*—Henry F. Epstein
*Attorney, Agent, or Firm*—Fischer, Tachner & Strauss

[57] ABSTRACT

Simulated stained and leaded glass windows which include bonded lead strips onto a pane of glass or plastic, forming design segments, and bonded coatings to the pane coincidental with the design segments simulating colored glass, and to a method for their preparation.

5 Claims, 3 Drawing Figures

SIMULATED STAINED AND LEADED GLASS WINDOWS

REFERENCE TO RELATED APPLICATION

This application is a continuation in part of copending application Ser. No. 158,919, filed June 12, 1980, which is now U.S. Pat. No. 4,335,170, issued June 15, 1982 which is a continuation of parent application Ser. No. 962,123, filed Nov. 20, 1978 and now abandoned.

BACKGROUND OF THE INVENTION

1. Technical Field

This invention relates generally to decorative windows and, more specifically, to decorative windows simulating the appearance of stained and leaded glass.

2. Description of the Prior Art

Stained and leaded glass has enjoyed a popularity for generations. Its inherent beauty and durability have graced the ancient cathedrals and buildings of state and, recently, has been the object of renewed interest for use in commercial and residential structures.

As the original stained and leaded glass technique involved time consuming and arduous processes, modern and simpler methods have been developed. However, the modern processes for producing "authentic" stained and leaded glass continue to require the cutting of individual segments of colored glass and the joining of such segments with grooved lead strips or came. The extensive use of came, especially in a window embodying an intricate design, results in a loss of structural integrity since the lead adds to the weight of the window and coincidentally makes the window pliable along each lead line. Thus, "authentic" stained and leaded glass windows which are of moderate to large size must be externally supported, for example, by metallic bars, which detracts from the beauty of the design. In addition, "authentic" stained and leaded glass is unsuitable for curved surfaces or environments which are exposed to extreme or frequent vibrations. Also, even the modern method of producing "authentic" stained and leaded glass is labor intensive and, thus, economically prohibitive for many applications, especially where large windows are desired.

In the construction of new buildings in particular, "authentic" stained and leaded glass is generally unsuitable for many windows as building codes frequently specify single pane tempered or plate glass for entry ways and windows installed in bearing walls. The segmented nature of the "authentic" windows is, thus, clearly prohibited. Moreover, tempered glass cannot be scored and broken in the manner required by such traditional techniques.

As a result of the above disadvantages, many attempts have been made to simulate stained and leaded glass. Such prior art techniques variously involve coloring clear glass panes using paints, varnishes, colored gelatin, acetate, cellophane, and tissue paper and involve simulated lead joints of adhesive-backed lead strips or lead emulsions brushed or squeezed onto the glass. However, no known simulated stained and leaded glass technique results in the permanence and beauty of "authentic" stained and leaded glass while producing a structurally sound window suitable for use in larger sizes, in curved windows, and in locations exposed to vibrations, or permitting the production to be applied to a window in place, without its removal.

BRIEF STATEMENT OF THE INVENTION

In order to provide simulated stained and leaded glass windows embodying permanence and structural integrity, the invention used lead strips which are coated with adhesive and applied to a clear glass or plastic pane to define closed areas of a selected pattern, and painted or pigmented polyester film is coated with adhesive and applied to the opposite side of the glass or plastic pane. Additionally, lead strips may then be applied to the second side of the pane coinciding with the original lead strips.

The lead strips do not separate the pane into small segments and, therefore, add rather than detract from structural integrity of the pane. The polyester film, after being applied with adhesive, becomes permanently affixed to the pane and, coincidentally, becomes a bonding media which minimizes shattering should the pane be broken, and which insulates the pane and reduces its transmission of ultra-violet sun rays.

BRIEF DESCRIPTION OF THE DRAWING

The invention may be more fully appreciated from the following detailed description of the preferred embodiment thereof taken in conjunction with the appended drawings wherein.

DETAILED DESCRIPTION OF A PREFERRED EMBODIMENT

Figure 1:
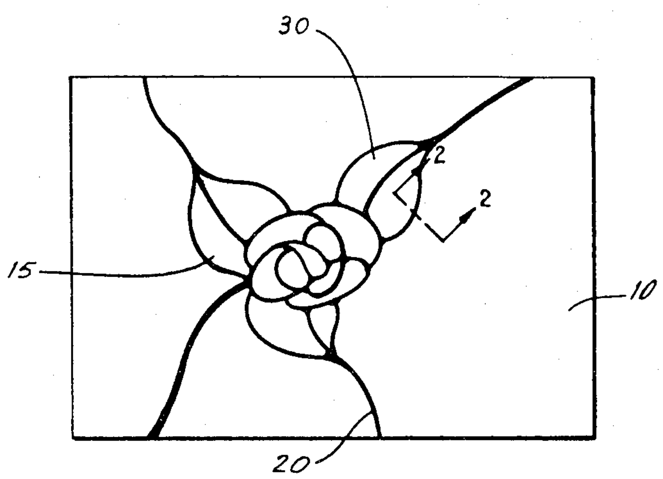
FIG. 1 is a plan view of a window pane embodying this invention.
Figure 2:
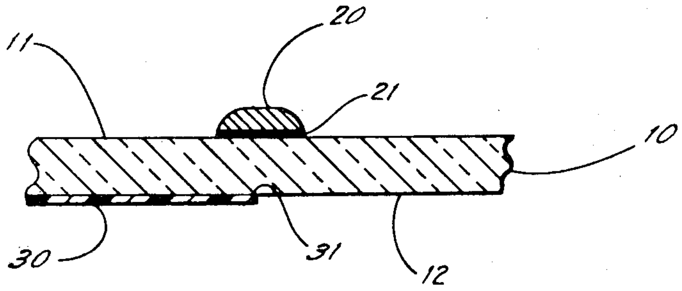
FIG. 2 is a sectional view taken along line 2—2 of FIG. 1.

Referring now to FIGS. 1 and 2, a glass or plastic pane 10 may be seen to be divided into a plurality of closed segments 15 by strips 20. The pane 10 may be any smooth, transparent surface and may be in any accessible location. Permissible materials of construction of the pane 10 include tempered, double strength, safety plate and frosted glass. In applying the techniques as taught herein, removal of the pane 10 from its mounting is unnecessary. In addition, while a flat planar surface is shown, the pane 10 may incorporate curved surfaces as found, for example, in vehicle windows and domed skylights. For illustrative purposes, each pane 10 will be assumed to incorporate a front side 11 and a reverse side 12.

The lead strips 20 are preferably extruded from pure lead or, alternatively, extruded using a lead alloy containing approximately 2% antimony, which alloy has a comparatively slower rate of oxidation. The lead or lead alloy strips 20 may be of various widths depending upon the desired esthetic effect and are preferably approximately 0.022 inch thick with one flat side.

The coating 30 is a film or sheet material. While polyester film is preferred, other sheet materials can be used for special effects, e.g., metal films, such as copper or brass.

Any or all of the design segments can also simulate beveled glass by selection of a transparent coating having a substantial thickness, e.g., a glass, polycarbonate or poly(methylmethacrylate) sheet up to about $\frac{1}{4}$ inch thick and having beveled edges. A jeweled glass appearance can also be simulated in one or more of the design segments by applying one or more flat-sided shapes or transparent material such as glass, polycarbonate or poly(methylacrylate). The exterior surface of these shapes can be faceted, or have a smooth curvature. These shapes can be applied with or without coating 30 and are similarly secured with a pressure sensitive adhesive.

Each segment 15 of the design may be variously colored by the addition of a painted or tinted coating 30 applied to the reverse side 12 of the pane 10 with the edges of the coating 30 coinciding with the lead strips 20 defining the segment 15.

The coating 30 is a flexible, transparent or translucent plastic such as vinyl or polyester resins, preferably formed of a polyester sheet approximately one mil or thicker sold commercially under the trademark MYLAR. Interposed between the pane 10 and the coating 30 is an adhesive 31 which greatly adds to the permanance of the simulated stained and leaded glass window and, in addition, imparts shatter proof characteristics to the pane 10.

Figure 3:
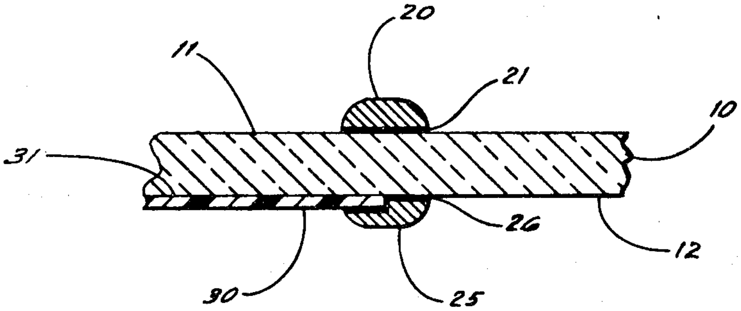
FIG. 3 is a sectional view simular to FIG. 2 showing an alternative embodiment.

As shown in FIG. 3, a second lead strip 25 may be applied to the reverse side 12 of the pane 10 coincidentally with the first lead strip 20. This embodiment would commonly be preferred where the pane 10 is routinely viewed from both the front 11 and reverse sides 12.

In the assembly of a simulated stained and leaded glass window, the pane 10 is first scrupulously cleaned and a decorative design is drawn directly upon the pane 10. Alternatively, a design drawn on paper may be temporarily taped to the reverse side 12 of the pane 10. Next, an appropriate adhesive 21 is applied to the flat side of the first lead strips 20. The adhesive 21 is preferably either clear, silver-gray, or black depending upon the esthetic effect desired. The lead may then be stretched to remove any kinks and undesired bends and then laid upon the front side 11 of the pane 10 covering the previously drawn lines of the design. A wooden tool, now shown, having a concave contour similar to the convex exposed side of the lead strips 20 is preferably utilized to urge the lead strips 20 firmly onto the pane 10 thus removing all entrapped air pockets and sealing the edges of the strips 20. Excess adhesive 21 may be removed by wiping with solvent, which can also remove any oxidation from the lead strips 20.

The next step involves applying the polyester coating 30 to the opposite side 12 of the pane 10 to simulate the appearance of colored glass. A sheet of polyester coating 30 must be chosen which equals or exceeds all the dimensions of the design section 15 to be colored. Polyester films which are coated with waterproof adhesives are commercially available, or alternatively, the waterproof adhesive 31 can be brushed, sprayed or rolled onto one side of the coating 30. Following the application of adhesive 31, a soap solution must then be brushed, sprayed or rolled onto the same side of the polyester coating 30. The soap solution, not shown in the drawing, neutralizes the adhesive 31 and allows the coating 30 to be positioned upon the reverse side 12 of the pane 10 where it may be slid into position opposite the appropriate design segment 15, where the coating 30 is then trimmed with a razor blade to match the edges of the coating 30 with the lead strips 20 of the design segment 15. The soap solution is then removed by pressing the coating 30 firmly against the pane 10 with a squeegee or similar tool, not shown in the drawing. Thus, the adhesive 31 permanently bonds the coating 30 to the pane 10.

From the discussion, it is clear that a polyester coating 30 tinted with impregnated pigment may be used to produce the desired color for each design segment 15. In addition, the polyester coating 30 may be painted, preferably by a silk screening process, prior to being applied to the pane 10 as discussed previously. The use of silk screening allows a broad range of effects including the simulation of "opaque" or translucent stained glass. This particular effect is enhanced by the use of "frosted" polyester. A third method of producing the desired color when utilizing the techniques of this invention involves the use of pigmented adhesive 31 which again allows for a wide range of esthetic effects and colors.

For simulated stained and leaded glass windows which are to be viewed from both the front side 11 and reverse side 12, second lead strips 25 may be applied to the reverse side 12 of the pane 10 using additional adhesive 26, whereby the second lead strips may be spatially located to coincide with the first lead strips 20. The use of second lead strips 25 is particularly desirable when the adhesive 21 used to secure the first lead strips 20 is black. If the polyester coating 30 used is of the painted type, as discussed above, it is preferable to utilize a transparent polyester coating, not shown in the drawing, similarly applied and covering the first coating 30 prior to attaching the second lead strips 25 so as to assure a permanent bond for the second lead strips 25. Using these techniques, there have been produced simulated stained and leaded glass for windows in vehicles where curvatures and vibrations make traditional stained and leaded glass techniques inapplicable. Also, large stained and leaded glass panes have been decorated where external supports are impractical or where building codes require a single pane as for example, in a standard sliding glass door. It has been found that the time required to produce a simulated stained and leaded glass window utilizing the techniques as described above is a fraction of the time which would be required were the more traditional came method to be used.

The invention can also be practiced more quickly than prior methods of painting glass to simulate colored glass, since the method isn't interrupted to permit pain coatings to dry and there is no need to mask off areas of the glass before applying coatings 30. The pressure sensitive adhesive has an excellent adhesion and provides a permanent bonding of the coating 30, where its peel strength exceeds its tear strength. The coating, particularly the polyester coating provides greater adhesion for paints than does a glass surface and the stability of the coating increases with weathering and age, far exceeding the durability of painted glass.

It is understood that the embodiment described above is merely an example of the application of the principles of this invention. Additional embodiments may be devised by those skilled in the art without departing from the spirit or scope of the invention.

I claim:

1. A simulated stained and leaded glass window structure comprising:

a. a pane substantially clear glass or plastic having a smooth first side and a smooth second side;

b. A plurality of lead strips adhered to the first side of the pane and forming closed design segments thereof;

c. a plurality of polyester plastic film segment coatings having on one side, color coatings simulating stained glass and on their undersurfaces, a pressure-sensitive adhesive coating affixed to the second side of the pane coinciding with the closed design segments, thereby imparting color thereto; and d. a plurality of second lead strips adhered to the second side of the pane in coincidental alignment with the lead strips adhered to the first side of the pane, and overlaying the joint lines between adjacent plastic film segment coatings.

2. A structure according to claim 1 further comprising a second film coating interposed between the coatings affixed to the second side of the pane and the second lead strips.

3. A structure according to claim 1 wherein the adhesive interposed between the pane and the coatings incorporates pigments imparting color to the closed design segments.

4. A structure according to claim 1 wherein at least one of the coatings incorporates pigments imparting color to the coating.

5. A structure according to claim 2 wherein the plastic film segment coatings affixed to the second side of the pane are painted with pigments to impart color to the coatings, using a silk screen painting process.

* * * * *